(12) United States Patent
Leancu (10) Patent No.: US 10,723,291 B2
(45) Date of Patent: Jul. 28, 2020

(54) HOLDING CLAMP FOR HOLDING VEHICLE PARTS IN A VEHICLE

(71) Applicant: Ford Global Technologies, LLC, Dearborn, MI (US)

(72) Inventor: Adrian Leancu, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/253,342

(22) Filed: Jan. 22, 2019

(65) Prior Publication Data

US 2019/0225169 A1  Jul. 25, 2019

(30) Foreign Application Priority Data

Jan. 22, 2018 (DE) .................. 10 2018 200 943

(51) Int. Cl.
| | |
|---|---|
| *F16L 3/00* | (2006.01) |
| *B60R 16/02* | (2006.01) |
| *H02G 3/32* | (2006.01) |
| *B60R 16/08* | (2006.01) |
| *F16L 3/223* | (2006.01) |
| *F16B 1/00* | (2006.01) |
| *F16L 55/035* | (2006.01) |

(52) U.S. Cl.
CPC .......... *B60R 16/0215* (2013.01); *B60R 16/08* (2013.01); *F16B 1/00* (2013.01); *F16L 3/223* (2013.01); *H02G 3/32* (2013.01); *F16L 55/035* (2013.01)

(58) Field of Classification Search
CPC .......................... H01R 13/6395; H01R 25/006

USPC .................. 248/63, 65, 71, 74.1, 74.2, 74.3
See application file for complete search history.

(56) References Cited

U.S. PATENT DOCUMENTS

| | | | |
|---|---|---|---|
| 5,460,342 A * | 10/1995 | Dore ................... | B60R 16/0215 248/68.1 |
| 6,036,145 A | 3/2000 | Calabrese et al. | |
| 7,207,528 B2 * | 4/2007 | Kato ........................ | F16L 3/13 248/55 |
| 7,267,307 B2 * | 9/2007 | Bauer ..................... | F16L 3/223 248/65 |
| 7,614,589 B2 * | 11/2009 | Kato ....................... | F16L 3/223 248/55 |
| 7,658,350 B2 * | 2/2010 | Bauer ..................... | F16L 3/223 24/458 |
| 9,453,593 B2 * | 9/2016 | Pearson .................. | F16L 3/223 |

(Continued)

FOREIGN PATENT DOCUMENTS

| | | |
|---|---|---|
| DE | 3503293 | 8/1985 |
| DE | 4200953 | 7/1993 |

(Continued)

*Primary Examiner* — Steven M Marsh
(74) *Attorney, Agent, or Firm* — Burris Law, PLLC (57) ABSTRACT

The present disclosure relates to a holding clamp for use in a motor vehicle that includes a base body with a main through-opening for receiving a fastening bolt. Fastening devices for fastening to the fastening bolt are arranged in a portion of the main through-opening proximate to the bolt. At least one latching unit arranged in a freely movable manner along a region of the main through-opening is provided which has a form-fitting element. In addition, a separate locking element is provided to make a form-fitting connection to the form-fitting element when the latching unit is in a predetermined position.

19 Claims, 4 Drawing Sheets

(56) References Cited

U.S. PATENT DOCUMENTS

| | | | | |
|---|---|---|---|---|
| 2011/0049312 A1* | 3/2011 | Kato | ................... | F16L 3/222 |
| | | | | 248/74.1 |
| 2013/0146720 A1* | 6/2013 | Meyers | ................. | F16L 3/223 |
| | | | | 248/68.1 |
| 2013/0240684 A1* | 9/2013 | Meyers | ................ | F16L 3/2235 |
| | | | | 248/74.1 |

FOREIGN PATENT DOCUMENTS

| | | |
|---|---|---|
| DE | 19812367 | 10/1998 |
| EP | 0666428 | 8/1995 |
| EP | 1607666 | 12/2005 |
| JP | H07174127 | 7/1995 |
| JP | H08303647 | 11/1996 |
| JP | 2006046508 | 2/2006 |

\* cited by examiner

HOLDING CLAMP FOR HOLDING VEHICLE PARTS IN A VEHICLE

CROSS-REFERENCE TO RELATED APPLICATIONS

This application is claims priority to and the benefit of German Application No.: 102018200943.0 filed on Jan. 22, 2018. The disclosure of the above application is incorporated herein by reference.

FIELD

The present disclosure relates to a holding clamp for use in a motor vehicle.

BACKGROUND

The statements in this section merely provide background information related to the present disclosure and may not constitute prior art.

It is known within the field of motor vehicle technology for holding clamps made of plastics materials, for example, to be used for holding on a motor vehicle undercarriage of the motor vehicle, for example on a vehicle frame of the motor vehicle, during the movement of lines such as fuel or brake lines, for example. In this case, the holding clamps have, on the one hand, fastening elements for holding the lines and, on the other hand, further fastening elements for attaching to the motor vehicle undercarriage. For example, in order to attach a holding clamp of this kind to the motor vehicle undercarriage, fastening bolts are provided on said undercarriage at predetermined fastening points. The fastening bolts may be connected to the motor vehicle undercarriage in a substance-bonded manner, for example welded on, integrally formed thereon or connected by adhesion. Alternatively, the fastening bolts may be fixedly connected to the motor vehicle body in a form-fitting or force-fitting manner, for example by screwing-in.

Numerous embodiments of holding clamps are known from the prior art.

By way of example, reference is made here to U.S. Pat. No. 6,036,145 A which describes an integrated system for protecting and fastening pipelines to a carrying structure, in particular to a vehicle body, by means of threaded pins which are welded onto the vehicle body. In this case, the system comprises at least one supporting element which is configured as a one-piece body or clip which, in turn, comprises a central portion with a through-hole housing. When in use, the system has a sleeve which fastens onto a threaded pin; moreover, at least one seat for a pipe and a flat circular supporting region surrounding the through-hole on the side eventually facing the vehicle body. The system contains a protection element integrated with the clip and defined by a channel which protects the pipes and is connected laterally to the clip by a thin flexible strip which allows a rotation of 180° onto the clip, so that the channel can be applied to the clip. The clip and the channel are co-molded simultaneously from the same material, such as from a co-polymer propylene resin with an appropriate filler. During assembly, the clip supporting the pipe is initially fastened to the vehicle body and retained temporarily to the threaded pin by radial tabs inside the through-hole. Once the channel is fitted onto the clip, the sleeve is inserted inside the through-hole and forced axially onto the threaded pin to fasten the channel and the clip lying thereunder by means of a flared head on the sleeve.

Furthermore, EP 1 607 666 A2 proposes a mounting clip for fastening lines such as brake lines, fuel lines, or the like, to the floor of a motor vehicle, in particular of an automobile. The mounting clip has recesses for receiving lines and has a through-opening for screwing the mounting clip with a fastening means on the undercarriage of the motor vehicle. In this case, a nut is, in addition, held rotatably in the mounting clip in a non-detachable manner. In addition, at least one fastening bolt which has a threaded portion is fastened on the motor vehicle undercarriage in such a manner that the mounting clip with the through-opening thereof can be fitted onto the fastening bolt and can be screwed fully automatically against the undercarriage with the nut held rotatably in the mounting clip in a non-detachable manner. In this case, the fastening bolt can be welded to the motor vehicle undercarriage, integrally molded thereon, screwed into the undercarriage or adhered thereto.

A correct attachment of the holding clips to the motor vehicle undercarriage is crucially important for guaranteeing the holding force anticipated for the laid lines, e.g. fuel and/or brake lines, during the running of the motor vehicle and therefore for the operational safety and compliance thereof with existing NVH (noise vibration harshness) requirements.

Various solutions have been proposed in the prior art for providing a simple and reliable means of confirming a correctly realized attachment of holding clamps to the motor vehicle undercarriage.

Hence, for example, EP 0 666 428 A1 describes a bolt-fastening element for use when mounting pipes, in particular fuel or brake lines of a vehicle, with which a fixed engagement of a bolt with the bolt-fastening element is provided, in that a bolt engagement portion of the bolt-fastening element is completely pressed onto the bolt. The bolt engagement portion is fitted with a bolt-receiving hole for receiving the bolt, so that the end of the bolt extends out of the hole. An elongate, elastic part of the bolt-fastening element extends in such a manner that the bolt-receiving hole is closed at a bolt outlet portion of the bolt-receiving hole. The elastic part is pressed out by the bolt end which projects from the outlet of the hole, so that the elastic part is raised from the closed position of the bolt-receiving hole. By looking at the elevated position of the elastic part, it is possible to check that the position of the bolt in the bolt-receiving hole is correct.

In addition, JPH 08 303647 A describes a pipe-holding element which is configured in such a manner that a pipe-retaining element is arranged opposite a pipe-insertion opening and a pipe-receiving seat on a base body on an insertion opening underside. In the insertion opening, a retaining claw is arranged on one or both sides, which retaining claw can be brought into engagement with a bolt of a vehicle. A movable element is arranged on a lower part of the insertion opening and extends from a lower partial wall to a lower center. It is possible to infer from a position of the moving element that the pipe-holding element has been correctly mounted on the pipe-holding element.

A similar solution is described in JPH 07 174127 A with a retaining part base body which is provided to be fastened to a bottom area of a vehicle, in that a clamping element and a bolt-receiving element are configured on the retaining part base body and, in addition, an engagement claw is formed which can be brought into engagement with a bolt of the vehicle. In addition, a movable cover is provided in the bolt-receiving element. This movable cover is initially located in a downward facing position. The movable cover is pressed upwards and elastically deformed into an upwardly oriented position when the bolt is correctly inserted therein in an anticipated manner. Consequently, it is possible for a technician to confirm that the bolt has been inserted to a normal insertion depth according to a change in state of the movable cover.

Another visual means for confirming that a holding clamp attachment has been correctly made is described in JP 2006 046508 A. A holding clamp is provided for fastening to a bolt, in a vehicle for example, which bolt is provided with a thread or a circular outer groove on an outer surface. The holding clamp comprises a bolt locking portion in which a bolt-receiving hole for introducing the bolt is formed and an inspection opening which is configured in the lateral face of the bolt-locking portion for the visual inspection of the bolt introduced into the bolt-receiving hole. The inspection opening is arranged in such a manner that it allows the visual inspection of the front end of the bolt in a state completely introduced into the bolt-receiving hole.

Although the holding clamps known in the art offer possible means of confirming correct attachment to a motor vehicle undercarriage, there is still room for improvement in the field of the reliable holding of lines, such as fuel or brake lines, but also electrical lines, by means of holding clamps on a motor vehicle undercarriage or a motor vehicle body.

SUMMARY

The present disclosure provides a holding clamp with improved means of confirming that an attachment to a motor vehicle undercarriage has been correctly made.

It should be pointed out that the features and measures individually specified in the following description can be combined with one another in any technically feasible manner and disclose further forms of the present disclosure. The description characterizes and specifies the present disclosure, particularly also in relation to the figures.

The holding clamp according to the present disclosure for use in a motor vehicle has a base body with a main through-opening for receiving a fastening bolt, wherein fasteners for fastening to the fastening bolt are arranged in a portion of the main through-opening proximate to the bolt. According to the present disclosure, at least one latching unit arranged in a freely movable manner along a region of the main through-opening is provided, which latching unit has a form-fitting element. A separate locking element is provided to make a form-fitting connection to the form-fitting element when the latching unit is in a predetermined position.

A "motor vehicle" as used herein should, in particular, be understood to mean an automobile, a truck, an articulated truck or a long-distance coach. The term "provided for" should be understood within the meaning of the present disclosure as being particularly specially designed or arranged for this purpose.

When fitting the holding clamp according to the present disclosure, the fastening bolt is received by the main through-opening and during this it forces the freely movably arranged latching unit along the main through-opening into a portion of the main through-opening remote from the bolt. In an appropriate form, the form-fitting element of the latching unit can be arranged in such a manner that a form-fitting connection between the form-fitting element of the latching unit and the separate locking element is made possible when the predetermined position of the latching unit is reached within the main through-opening, something that is brought about by the fastening bolt penetrating the main through-opening up to a desired position of the fastening bolt.

In this way, a holding clamp can be provided with an improved means of confirming that an attachment to a motor vehicle undercarriage has been correctly made in a structurally simple manner.

The form-fitting connection is designed in one form to be free from play or with a negligible amount of play, so that the predetermined position of the latching unit can be precisely defined. When designing the form-fitting connection, a compromise can be sensibly reached between a precise definition of the predetermined position of the latching unit and maneuverability of the separate locking element when forming the form-fitting connection to the latching unit, so that mounting of the holding clamp is not overcomplicated unnecessarily.

The main through-opening may exhibit varying cross-sectional areas along its extension within the base body. For example, in certain portions of the extension of the main through-opening, one or more constrictions of the cross-sectional area are provided which define a movement space of the latching unit arranged in a freely movable manner.

If the latching unit has latching elements which are provided to create latching connections to corresponding latching elements of the base body when the latching unit is in the predetermined position within the main through-opening, the form-fitting connection between the form-fitting element of the latching unit and the separate locking element can be made through one-handed mounting. Furthermore, in an appropriate form of the latching elements of the latching unit and the latching elements of the base body, a latching noise or a latching movement can be produced when the latching connections are made which can be used as a first confirmation signal and which a technician can detect either acoustically and/or by touch.

In one form, the holding clamp comprises at least one holding device for holding at least one pipe or at least one electrical cable.

The at least one pipe may be configured as a fuel line or a brake line. The at least one electrical cable may be a single cable or a constituent part of a cable tree in which a plurality of electrical cables is present as a bundle.

The at least one holding device is in one form fixedly connected to the base body of the holding clamp.

If the base body and the at least one holding device are integrally formed, a compact holding clamp design can be achieved.

In another form of the holding clamp, the base body, the at least one holding device, the latching unit and the separate locking element are predominantly produced from a thermoplastic material.

The term "predominantly" within the meaning of the present disclosure should, in particular, be understood to include a proportion of more than 50 vol. %, for example a portion of more than 70 vol. % or a portion of more than 90 vol. %. In particular, the term should include the possibility that the aforementioned objects are formed entirely, i.e. by 100 vol. %, from the thermoplastic material.

In this case, methods with very good dimensional stability such as, for example, injection molding can be used to produce the holding clamps, as a result of which the predetermined position of the latching unit in order to make the form-fitting connection to the separate locking element can be defined particularly precisely. In addition, holding clamps configured in this manner can be produced particularly cost-effectively.

In particular, the special mechanical properties of the thermoplastic materials mean that latching elements can be supplied on the latching unit, which latching elements advantageously have particularly elastic properties.

In one form, thermoplastic materials which are tried-and-tested and have proven successful in vehicle technology, for example acrylonitrile butadiene styrene (ABS), polyoxymethylene (POM), polybutylene terephthalate (PBT), and the polyamide group (PA), can be used to produce the holding clamps.

In various forms of the holding clamp, guide elements are arranged on an inner wall of the main through-opening which are provided to guide and hold the latching unit during a movement within the main through-opening.

In this way, the latching unit can be moved during an assembly process by means of the fastening bolt in a particularly reliable manner from an original position within the main through-opening into the predetermined position.

When the latching unit is in the predetermined position, the base body in one form has a lateral through-opening with access to the main through-opening in a region of the form-fitting element of the latching unit. During the making of the form-fitting connection to the form-fitting element of the latching unit, the separate locking element is provided to penetrate the lateral through-opening perpendicularly to a main extension direction of the main through-opening.

In this way, good accessibility to the form-fitting element of the latching unit in order to make the form-fitting connection to the separate locking element for the purpose of confirming that the holding clamp is correctly attached to a motor vehicle undercarriage can be guaranteed.

The main extension direction of the main through-opening may, for example, be formed by a longest center line of the main through-opening.

If a dimension of the lateral through-opening corresponds at least in a direction parallel to a center line of the main through-opening to a dimension of the separate locking element in this direction, or slightly exceeds it, the predetermined position of the latching unit in which a form-fitting connection to the separate locking element can be made can be particularly accurately defined.

The term "slightly exceed" should be understood within the meaning of the present disclosure to denote a difference between the two dimensions that is smaller than 20%, for example smaller than 15% or smaller than 10% of one of the two dimensions.

When selecting the dimension, a compromise can reasonably be reached between a precise definition of the predetermined position of the latching unit and maneuverability of the separate locking element when the lateral through-opening is penetrated to make the form-fitting connection to the latching unit, so that the mounting of the holding clamp is not complicated unnecessarily.

In one form of the holding clamp, the separate locking element has latching elements which are provided to make additional latching connections to corresponding latching elements of the latching unit when the form-fitting connection to the latching unit is made.

On the one hand, the elasticity of the latching connections means that the formation of the form-fitting connection to the latching unit can be made easier. In addition, a latching noise or a latching movement can be produced when the latching connections are made which can be used as a second confirmation signal and detected by a technician acoustically and/or by touch. Moreover, the additional latching connections mean that the separate locking element can be held in a non-detachable manner, so that it is still possible to confirm a correct attachment of the holding clamp to the motor vehicle undercarriage at a later point in time.

The fasteners for fastening the base body to the fastening bolt are in some aspects of the present disclosure formed by a plurality of form-fitting elements which are provided to create form-fitting connections to at least one form-fitting element of the fastening bolt. In this way, a reliable retention of the holding clamp on the fastening bolt can be achieved in a structurally simple manner.

The at least one form-fitting element of the fastening bolt may, for example, be formed by one or more peripheral grooves or projections or by a threaded portion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
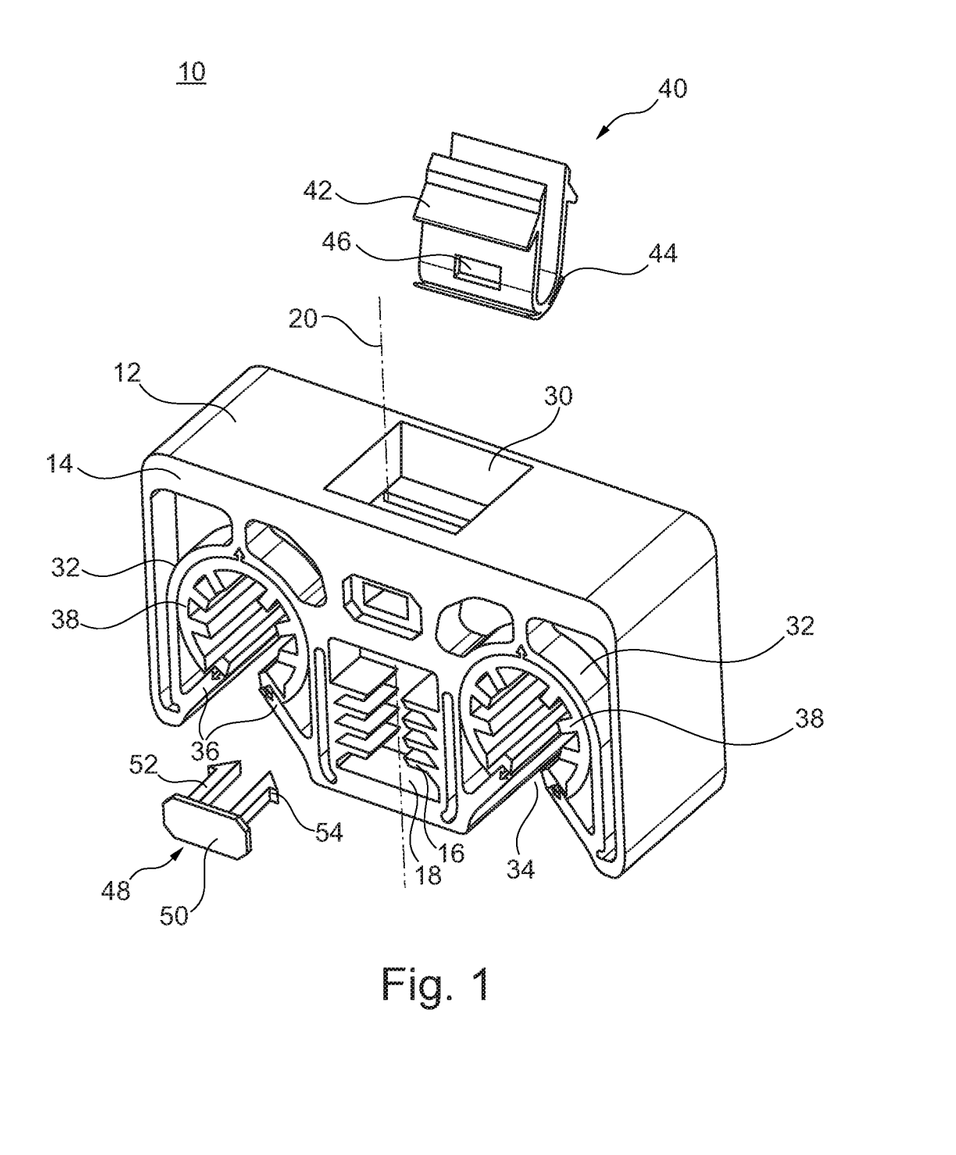
FIG. 1 is a top perspective view of a holding clamp according to the teachings of the present disclosure.

FIG. 1 shows a schematic representation of a possible form of a holding clamp 10 according to the teachings of the present disclosure for use in a motor vehicle from an elevated, perspective view.

The holding clamp 10 has a base body 12 which is substantially configured in the form of a block. An installation position of the holding clamp 10 is provided in such a manner that in an installation state a base area of the block formed by a longest side and a shortest side faces an undercarriage of the motor vehicle.

The base body 12 of the holding clip 10 is fitted with a main through-opening 18. A main extension direction 20 of the main through-opening 18 is defined by a center line of the main through-opening 18 arranged perpendicularly to the base area.

In addition, the holding clamp 10 has two holding devices 32 for receiving a pipe in each case (not shown), which may be in the form of a fuel line, brake line or an electrical line, for example. The base body 12 and the two holding devices 32 are made entirely of a thermoplastic material, for example acrylonitrile butadiene styrene (ABS), and are integrally formed through production by means of an injection-molding process.

The two holding devices 32 in the base body 12 are shaped as cylindrical recesses with slot-shaped openings 34 facing the base area, wherein each of the two openings 34 is defined by two plate-shaped crosspieces 36 integrally formed with the base body 12 and projecting into the respective cylindrical recess. Center axes of the cylindrical recesses are arranged perpendicularly to a side face 14 of the body, the edge thereof is formed by the two longest sides of the block. A connection of each of the plate-shaped crosspieces 36 to the base body 12 functions as an integral hinge, so that each of the plate-shaped crosspieces 36 is pivotable about an axis in an elastic manner, which axis is arranged parallel to the center axes of the cylindrical recesses. Diameters of the cylindrical recesses and intervals between the plate-shaped crosspieces 36 are adapted to a diameter of the lines in such a manner that the lines can be laid through the slot-shaped openings 36 and against an elastic spring force of the plate-shaped crosspieces 36 into the respective cylindrical recess. Following a recoil, the plate-shaped crosspieces 36 block a re-emergence of the lines from the cylindrical recesses.

Support bearings 38 with radially arranged ribs made of an elastomer are injected onto inner walls of the cylindrical recesses. The support bearings 38 are used for sound insulation when the holding clamp 10 is in the installed state.

Furthermore, the holding clamp 10 contains a latching unit 40. The latching unit 40 is configured as an injection-molded part made entirely of a thermoplastic material, for example ABS, and has a substantially U-shaped profile. On the two longitudinal edges of the U-profile opening are formed outwardly projecting upper latching elements 42 facing the curvature of the U-profile. On outer sides of the curvature of the U-profile are formed further lower latching elements 44 parallel to the upper latching elements 42 which project outwardly and are oriented to the upper latching elements 42, so in the opposite direction to the latching elements 42.

The latching unit 40 has at least one form-fitting element 46 which is configured as a rectangular through-opening in one or both legs of the U-shaped profile. The function of the form-fitting element 46 is explained later. The form-fitting element 46 may be arranged in both legs. If the form-fitting element 46 is arranged in one of the legs, a predefined installation position is advantageously specified.

Figure 3:
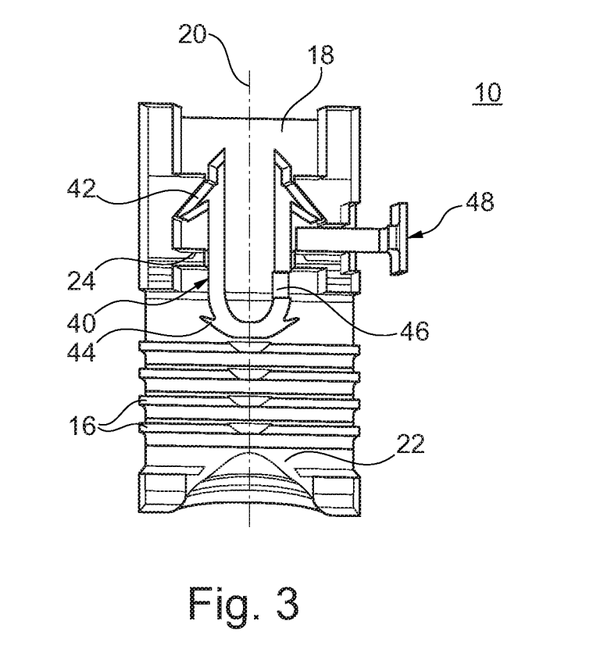
FIG. 3 is a cross-sectional view of the holding clamp according to FIG. 2.
Figure 4:
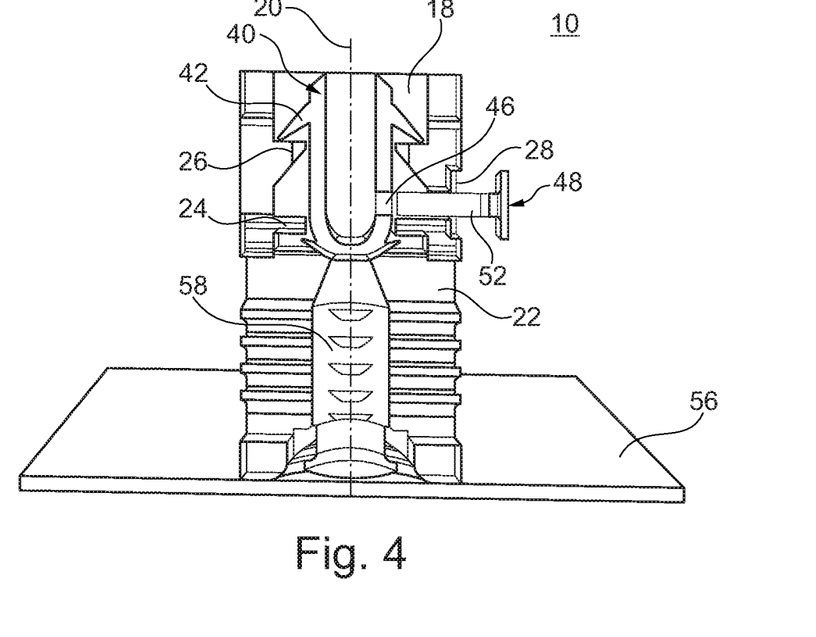
FIG. 4 is a cross-sectional view of the holding clamp according to FIG. 2 in a partially mounted state.
Figure 5:
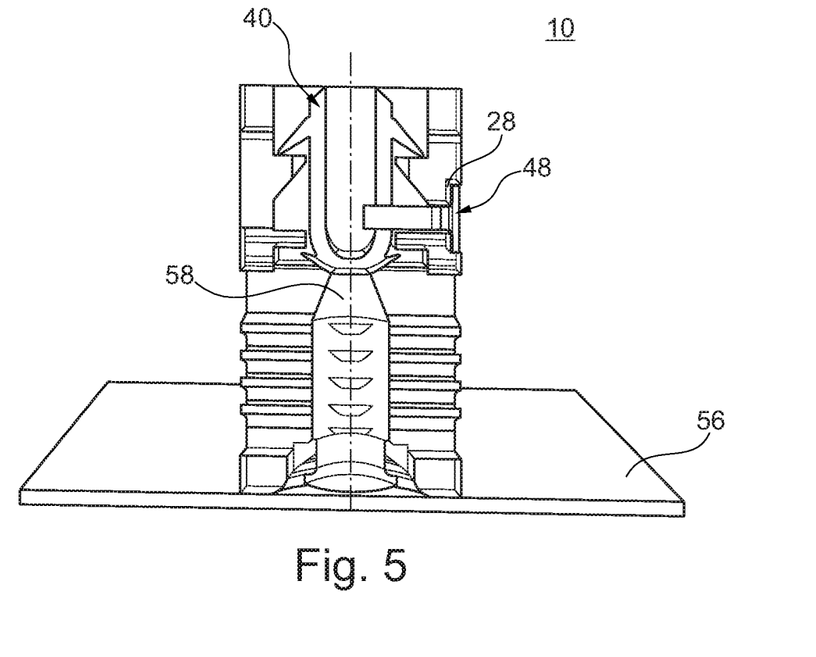
FIG. 5 is a cross-sectional view of the holding clamp according to FIG. 2 in a mounted state.

As can be seen most clearly from FIGS. 3 to 5, the main through-opening 18 is provided with varying cross-sectional surfaces along its main extension direction 20 within the base body 12. A lower portion 22 of the main through-opening 18 adjacent to the base area which extends to just above half of the extension of the main through-opening 18 is provided to receive a fastening bolt 58 of the motor vehicle. The fastening bolt 58 is substance-bonded by welding, for example, to a carrier 56 of the chassis of the motor vehicle and provided with an external thread.

Fasteners 16 for fastening to the fastening bolt 58 are arranged on the base body 12 in this lower portion 22 of the main through-opening 18 proximate to the bolt. The fasteners 16 are formed by a plurality of form-fitting elements which are configured as elastically deformable profile crosspieces with a substantially triangular profile which are integrally formed on the base body 12. With a receiving means of the fastening bolt 58 in the portion 22 of the main through-opening 18 adjoining the base area, the profile crosspieces with the outer thread as a corresponding form-fitting element create form-fitting connections which provide a fixed connection between the holding clamp 10 and the fastening bolt 58, insofar as the holding clamp 10 is correctly attached to the fastening bolt 58.

Figure 2:
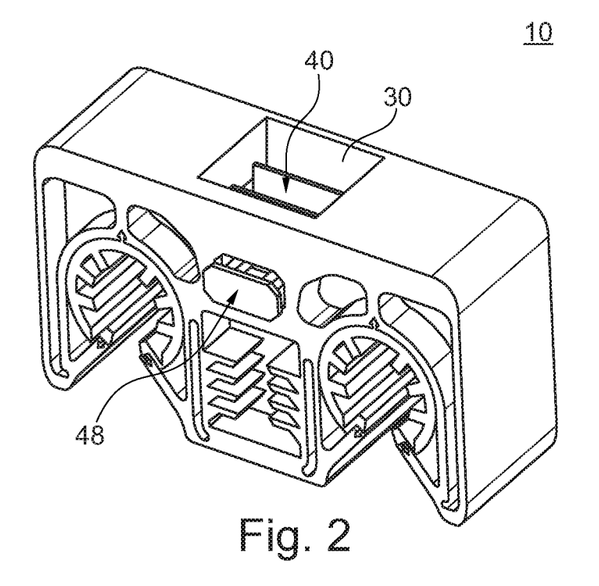
FIG. 2 is a top perspective view of the holding clamp according to FIG. 1 in a ready-to-use state.

FIG. 2 shows a schematic representation of the holding clamp 10 according to FIG. 1 in a ready-to-use state in an elevated, perspective view, and FIG. 3 shows the holding clamp 10 in the ready-to-use state in a central section in a transverse direction. As can be seen in FIG. 3, the latching unit 40 is arranged in a freely movable manner in a region along the main through-opening 18.

Guide elements 24 are arranged on an inner wall of the main through-opening 18 (FIG. 4) which are provided to guide the latching unit 40 during a movement within the main through-opening 18 or else to retain the latching unit 40 in the main through-opening 18.

A guide element 24 that is configured as a pair of opposite steps projecting into the main through-opening 18 at the same time defines an upper limit of the lower portion 22 of the main through-opening 18 proximate to the bolt. The latching unit 40 is freely movable in a direction in the portion 22 of the main through-opening 18 proximate to the bolt, until the upper latching elements 42 of the latching unit 40 come into mechanical abutment with the guide elements 24. The latching unit 40 is, in addition, freely movable in a direction from the portion 22 of the main through-opening 18 proximate to the bolt, until the lower latching elements 44 of the latching unit 40 come into mechanical abutment with the guide elements 24. A region of the main through-opening 18, along which the latching unit 40 is arranged in a freely movable manner, is defined by the position of the guide elements 24 and by the space between the upper latching elements 42 and the lower latching elements 44 of the latching unit 40.

In a direction pointing away from the bolt and spaced apart from the guide elements 24, indents 26 which are arranged opposite one another on the inner wall of the main through-opening 18 and which are configured as inclined planes on an underside facing the guide element 24, the angles of inclination of said planes being substantially parallel to an orientation of the upper latching elements 42 of the latching unit 40. Upper sides of the indents 26 facing away from the guide element 24 are configured as planar surfaces. The planar surfaces form latching elements of the base body which correspond to the upper latching elements 42 of the latching unit 40.

Moreover, the holding clamp 10 comprises a separate locking element 48 (FIG. 1). The separate locking element 48 is formed as an injection-molded part entirely from a thermoplastic material, for example from ABS. The separate locking element 48 has a base plate 50 from which two crosspieces 52 arranged in parallel and spaced apart extend perpendicularly to the base plate 50. On the ends of the two crosspieces 52 facing away from the base plate 50, the separate locking element has hook-shaped latching elements 54.

As explained below, the separate locking element 48 is provided to create a form-fitting connection to the form-fitting element 46 of the latching unit 40 when the latching unit 40 is in a predetermined position. To this end, the base body 12 has a lateral through-opening 28 in a region of the form-fitting element 46 of the latching unit 40 in the predetermined position of the latching unit 40 with access to the main through-opening 18. The separate locking element 48 is provided to penetrate the lateral through-opening 28 perpendicular to the main extension direction 20 of the main through-opening 18 when the form-fitting connection to the form-fitting element 46 of the latching unit 40 is made. A through-opening 28 of this kind is advantageously only provided on one side of the holding clamp 10. If the latching unit 40 likewise only has a form-fitting element 46 in one of the crosspieces, a predefined installation position of the latching unit 40 and/or of the holding clamp 10 is specified, which further increases the reliability of the correct assembly.

The mounting of the holding clamp 10 on the fastening bolt 58 takes place with the holding clamp 10 in the ready-to-use state, as depicted in FIG. 2, in which the latching unit 40 is introduced through an opening 30 of the main through-opening 18 remote from the pin and with the closed part of the U-shape, in other words with its base crosspiece at the front into the main through-opening 18. In order to overcome the indents 26, the upper latching elements 42 of the latching unit 40, for this purpose, is bent towards the legs of the U-shape, so that the latching unit 40 is then arranged in a non-detachable manner within the main through-opening 18 (FIG. 3). The latching unit 40 is oriented in such a manner that the form-fitting element 46 of the latching unit 40 faces the lateral through opening 28 of the base body 12.

As can be seen from FIG. 3, it is difficult for a form-fitting connection to be made between the separate locking element 48 and the form-fitting element 46 of the latching unit 40 when the holding clamp 10 is in the ready-to-install state.

In order to mount the holding clip 10 on the fastening bolt 58, the base body 12 with the base surface at the front is fitted onto the fastening bolt 58, so that it penetrates the main through-opening 18 (FIG. 4). The lower portion 22 of the main through-opening 22 receives the fastening bolt 58 which comes into mechanical abutment during the penetration movement with the closed portion of the U-profile of the latching unit 40, in other words with the base crosspiece, and pushes the latching unit 40 in front of it along the main extension direction 20 of the main through-opening 18.

Figure 6:
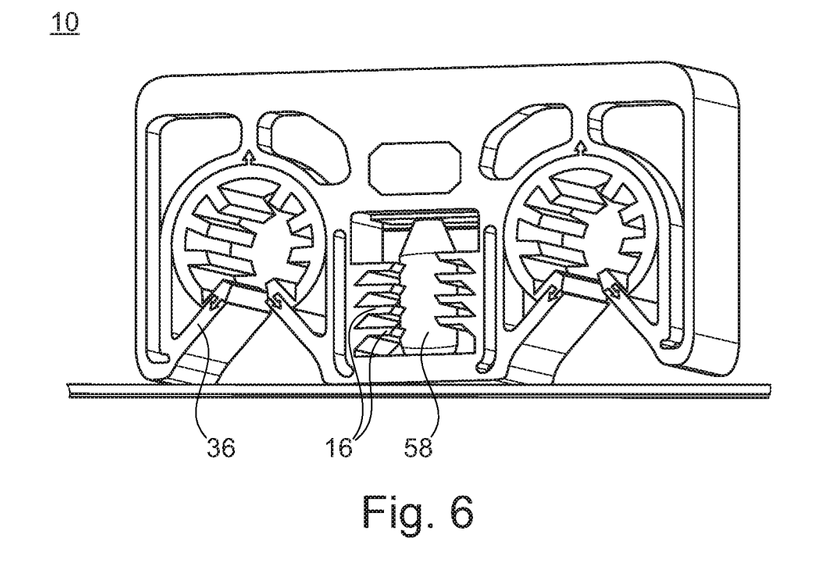
FIG. 6 is a bottom perspective view of the holding clamp according to FIG. 2 in a mounted state.

If the holding clamp 10 is pushed onto the fastening bolt 58 in the intended manner, the latching unit 40 is in a predetermined position within the main through-opening 18. The predetermined position of the latching unit 40 is depicted in FIG. 4. The elastically deformable profile crosspieces 16 make form-fitting connections to the outer thread of the fastening bolt 58 (FIG. 6), which form-fitting connections guarantee a fixed connection between the holding clamp 10 and the fastening bolt 58.

Figure 7:
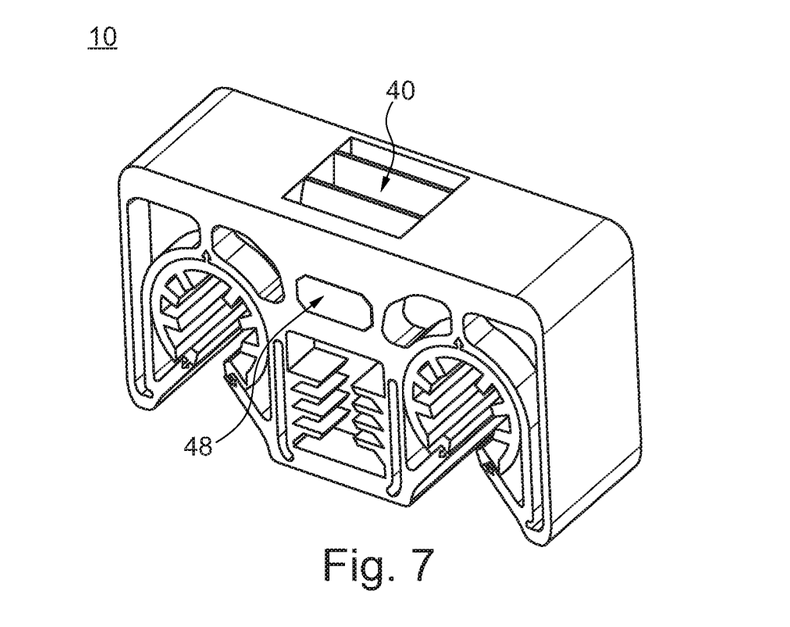
FIG. 7 is a top perspective view of the holding clamp according to FIG. 2 in a mounted state.

On the path followed by the latching unit 40 from the position in the ready-to-install state to the predetermined position, the upper latching elements 42 of the latching unit 40 pass the inclined planes of the indents 26 in the main through-opening 18 and make latching connections with the upper sides of the indents 26 (FIG. 4). The formation of the latching connection produces a latching noise which can be acoustically detected by a technician as the first confirmation signal. In addition, the latching unit 40 appears in the opening 30 in the main through-opening 18 remote from the bolt and can be perceived there by a technician for further confirmation (FIG. 7).

The holding clamp 10 is depicted in a partially mounted state in FIG. 4, in which the latching unit 40 is located in the predetermined position. The form-fitting element 46 of the latching unit 40 can be seen to be located at the same distance from the base surface as the lateral through-opening 28.

A dimension of the lateral through-opening 28 in a direction parallel to the main extension direction 20 of the main through-opening 18 slightly exceeds a dimension of the base plate 50 of the separate locking element 48 in this direction and is substantially greater than a dimension of the crosspieces 52 of the separate locking element 48 in this direction.

A dimension of the form-fitting element 46 of the latching unit 40 in a direction parallel to the main extension direction 20 of the main through-opening 18 slightly exceeds a dimension of the crosspieces 52 of the separate locking element 48 in this direction.

Only in the partially mounted state of the holding clamp 10 shown in FIG. 4 can the separate locking element 48 be inserted by the technician into the form-fitting element 46 of the latching unit 40 to make a form-fitting connection. During the insertion process, the locking elements 54 (FIG. 1) slide to the ends of the crosspieces 52 of the separate locking element 48 on side walls of the form-fitting element 46, wherein they are elastically deformed. The latching elements 54 of the separate locking element 48 are designed in such a manner that they are moved past the side walls of the form-fitting element 46 when the separate locking element 48 (FIG. 4) is completely inserted into the lateral through-opening 28. In this way, the latching elements 54 of the separate locking element 48 form latching connections to the side walls of the form-fitting element 46 which act as corresponding latching elements of the latching unit 40.

The creation of these latching connections produces a latching noise or a latching movement that a technician can detect acoustically and by touch as the second confirmation signal. In addition, a length of the crosspieces 52 of the separate locking element 48, a thickness of the base plate 50 of the separate locking element 48 and a recess in the base body 12 which surrounds the lateral through-opening 28, are of such dimensions that the base plate 50 of the separate locking element 48 ends flush with the base body 12 (FIG. 7) when the separate locking element 48 is completely inserted, which can be perceived by the technician by touch as further confirmation.

All in all, it is thereby provided that the holding clamp 10 is correctly fitted.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A holding clamp for use in a motor vehicle, the holding clamp comprising:
a base body with a main through-opening for receiving a fastening bolt;

a fastener arranged in a portion of the main through-opening proximate the fastening bolt;

at least one latching unit arranged in a freely movable manner along a region of the main through-opening, the at least one latching unit comprising a form-fitting element; and a locking element adapted to make a form-fitting connection to the form-fitting element when the at least one latching unit is in a predetermined position.

2. The holding clamp according to claim 1, wherein the at least one latching unit has latching elements that create latching connections to corresponding latching elements of the base body when the at least one latching unit is in the predetermined position within the main through-opening.

3. The holding clamp according to claim 1 further comprising at least one holding device for holding at least one pipe or at least one electrical cable.

4. The holding clamp according to claim 3, wherein the base body and the at least one holding device are integrally formed.

5. The holding clamp according to claim 3, wherein the base body, the at least one holding device, the at least one latching unit, and the locking element are predominantly produced from a thermoplastic material.

6. The holding clamp according to claim 1 further comprising guide elements arranged on an inner wall of the main through-opening to guide and hold the at least one latching unit during a movement within the main through-opening.

7. The holding clamp according to claim 1, wherein when the at least one latching unit is in the predetermined position, the base body has a lateral through-opening with access to the main through-opening in a region of the form-fitting element of the at least one latching unit, and the locking element penetrates the lateral through-opening perpendicularly to a main extension direction of the main through-opening during the making of the form-fitting connection to the form-fitting element of the latching unit.

8. The holding clamp according to claim 7, wherein a dimension of the lateral through-opening corresponds to a dimension of the locking element in at least a direction parallel to the main extension direction of the main through-opening.

9. The holding clamp according to claim 7, wherein a dimension of the lateral through-opening slightly exceeds a dimension of the locking element in at least a direction parallel to the main extension direction of the main through-opening.

10. The holding clamp according to claim 1, wherein the locking element has latching elements which are provided to make additional latching connections to corresponding latching elements of the at least one latching unit when the form-fitting connection to the at least one latching unit is made.

11. The holding clamp according to claim 1, wherein the fastener is formed by a plurality of form-fitting elements such that form-fitting connections to at least one form-fitting element of the fastening bolt is created.

12. A holding clamp comprising:

a base body including a main through-opening;

at least one latching unit arranged along a region of the main through-opening of the base body, wherein the at least one latching unit includes latching elements that create latching connections to corresponding latching elements of the base body when the at least one latching unit is in a predetermined position within the main through-opening; and a locking element adapted to make a form-fitting connection with the at least one latching unit when the at least one latching unit is in the predetermined position.

13. The holding clamp according to claim 12 further comprising at least one holding device.

14. The holding clamp according to claim 13, wherein the base body and the at least one holding device are integrally formed.

15. The holding clamp according to claim 12 further comprising guide elements arranged on an inner wall of the main through-opening of the base body.

16. The holding clamp according to claim 12, wherein the base body includes a lateral through-opening accessible to the main through-opening in a region of at least one form-fitting element of the at least one latching unit.

17. The holding clamp according to claim 16, wherein a dimension of the lateral through-opening corresponds to a dimension of the locking element in at least a direction parallel to a main extension direction of the main through-opening.

18. The holding clamp according to claim 16, wherein a dimension of the lateral through-opening slightly exceeds a dimension of the locking element in at least a direction parallel to the main extension direction of the main through-opening.

19. The holding clamp according to claim 12, wherein the locking element includes latching elements adapted to make latching connections to corresponding latching elements of the at least one latching unit when the form-fitting connection with the at least one latching unit is made.

* * * * *